Dec. 26, 1950  D. E. SCHWARTZ ET AL  2,535,095
BOMB SHACKLE RELEASE
Filed July 23, 1948  6 Sheets-Sheet 1
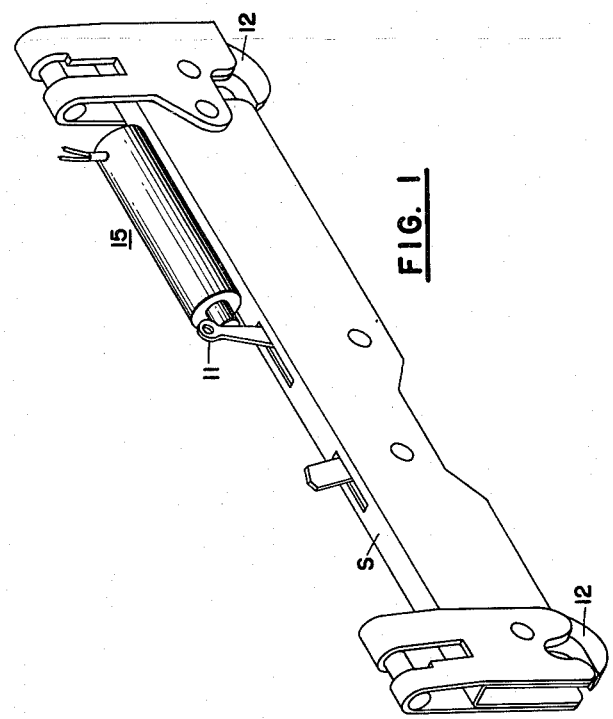
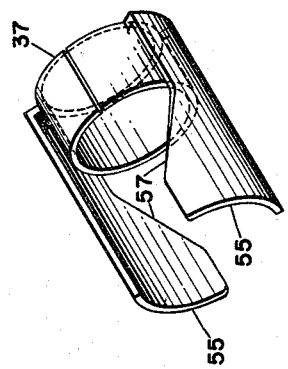
Inventors
DANIEL E. SCHWARTZ
ROBERT E. KEMELHOR
By M C Hayes
Attorney Dec. 26, 1950  D. E. SCHWARTZ ET AL  2,535,095
BOMB SHACKLE RELEASE
Filed July 23, 1948  6 Sheets-Sheet 2

Inventors
DANIEL E. SCHWARTZ
ROBERT E. KEMELHOR

By M.Q.Hayes

Attorney

Dec. 26, 1950　　　D. E. SCHWARTZ ET AL　　　2,535,095
BOMB SHACKLE RELEASE

Filed July 23, 1948　　　　　　　　　　　　　6 Sheets-Sheet 3

Inventors
DANIEL E. SCHWARTZ
ROBERT E. KEMELHOR

By

Attorney

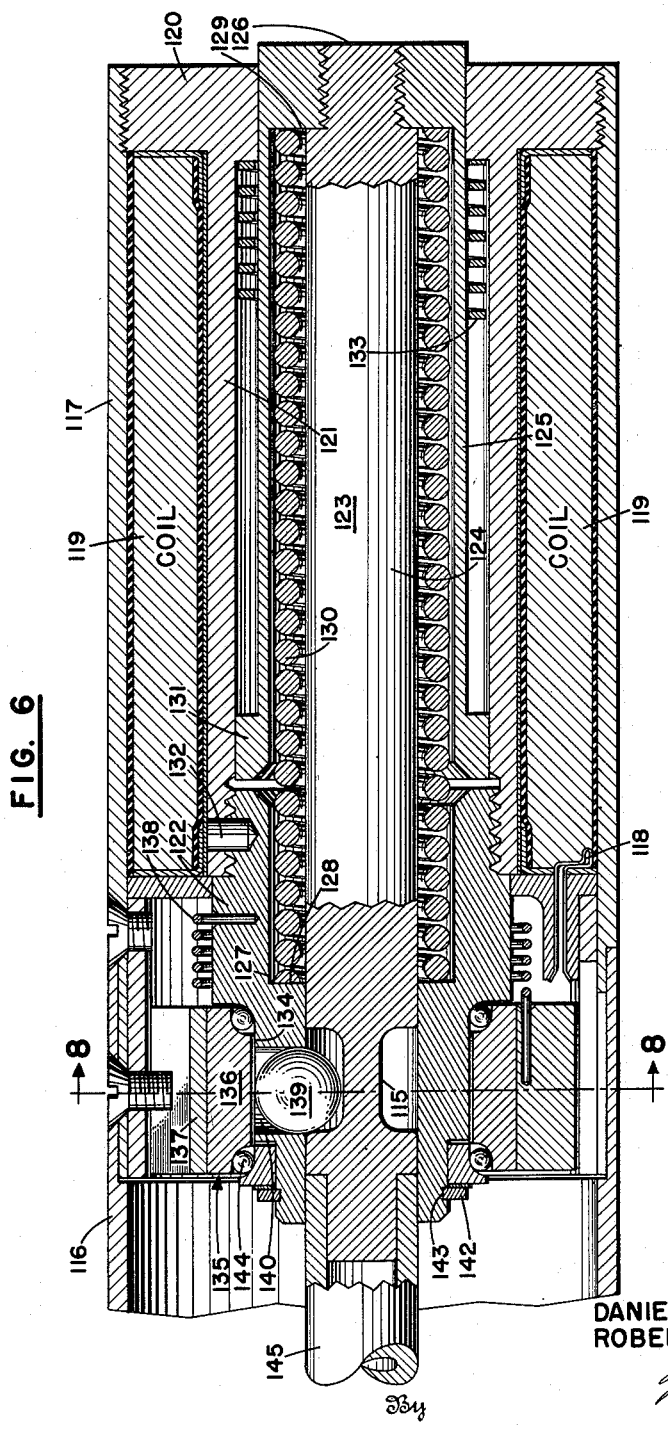

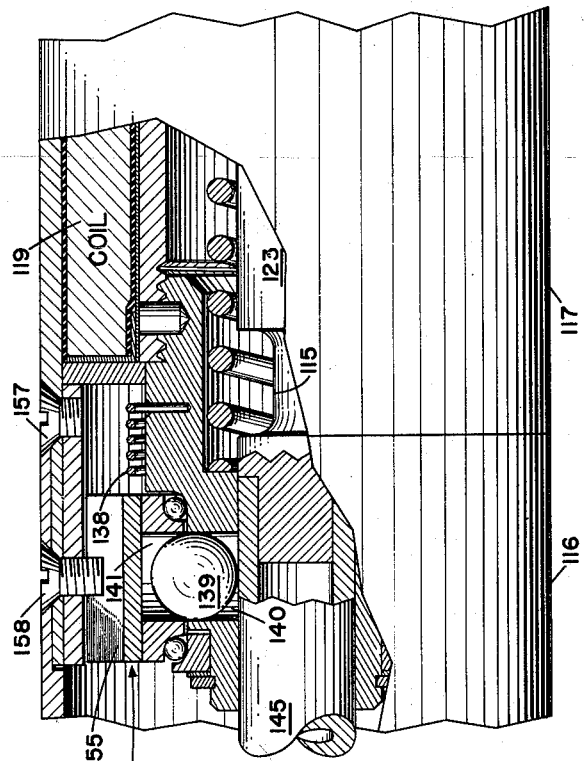
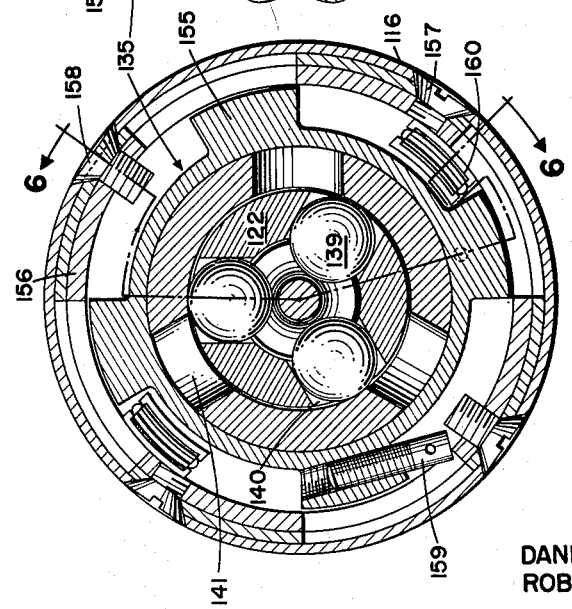

Dec. 26, 1950   D. E. SCHWARTZ ET AL   2,535,095
BOMB SHACKLE RELEASE

Filed July 23, 1948   6 Sheets-Sheet 6

Inventors
DANIEL E. SCHWARTZ
ROBERT E. KEMELHOR
By M. O. Hayes
Attorney

Patented Dec. 26, 1950

2,535,095

UNITED STATES PATENT OFFICE 2,535,095

BOMB SHACKLE RELEASE

Daniel E. Schwartz, Narrowsburg, and
Robert E. Kemelhor, Bronx, N. Y.

Application July 23, 1948, Serial No. 40,413

16 Claims. (Cl. 74—2)

(Granted under the act of March 3, 1883, as
amended April 30, 1928; 370 O. G. 757)

This invention relates to a bomb shackle release and more particularly to a bomb shackle release of the electromagnetic type for releasing bomb suspension equipment in an aircraft and for performing the necessary internal electrical switching required for aircraft bomb release systems.

The prior art devices have employed a spring loaded rod held in cocked position by a mechanical stop member whose position is controlled by an electric relay. When the relay is energized its latching armature is attracted and releases the release armature which is then attracted causing the stop member to be moved out of position and thus freeing the spring loaded rod. At the end of the energization of the relay the release armature is released and moves back into position thereby closing the transfer switch contacts and opening the relay contacts of the release mechanism. The closing of the transfer switch contacts completes a circuit to the shackle release at the next bomb release station.

It has been found that these prior art mechanisms are susceptible to shock, particularly that created by violent acceleration of the craft, and that this shock causes the release of the stop member and the inadvertent release of the bomb. Furthermore, it has been found that the shock, although insufficient to cause actuation of the release mechanism, has caused accidental closing of the transfer contacts thereby completing the circuit to the next bomb release mechanism and causing release of the succeeding bomb either at the same time or too shortly after the release of the first one.

An object of this invention is the provision of a bomb release mechanism which is exceedingly smaller in size and in weight than the prior mechanisms and yet exerts a greater force than that heretofore attainable.

Another object is to provide an improved release mechanism that is less susceptible to premature release under high shock loads.

A further object of the invention is the provision of a release mechanism having a transfer switching device operable automatically in synchronism with the bomb release actuator.

Still another object of this invention is to provide a bomb release mechanism employing a rotary magnet to trigger the locking mechanism and thereby operating the bomb release only upon proper energization.

Other objects and advantages of the invention will hereinafter become more fully apparent from the following description of the annexed drawings, which illustrate preferred embodiments, and wherein:

Fig. 1 illustrates, in perspective, my invention shown in place upon a conventional bomb release shackle.

Fig. 5 is a detailed perspective of the armature of Fig. 2.

Fig. 6 is a longitudinal sectional view of another embodiment of the release mechanism in cocked position.

Fig. 7 is a side elevation, partly in section, showing the mechanism of Fig. 6 in released position.

Fig. 8 is a section on the line 8—8 of Fig. 6 taken in the direction of the arrows.

Figure 2:
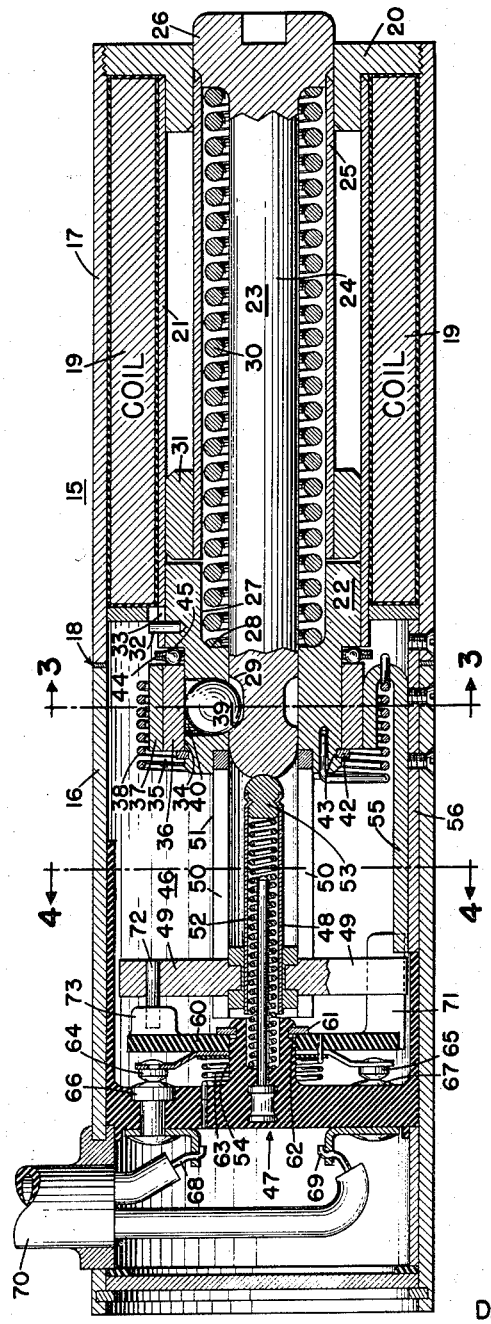
Fig. 2 is an enlarged longitudinal sectional view of one embodiment of the invention as shown in cocked position.

Referring now to the drawings, wherein like reference characters designate like or corresponding parts throughout the several views, there is shown in Fig. 1 a conventional bomb release shackle S having the usual release lever 11 and bomb supporting hooks 12. The release mechanism 15 of the present invention is shown mounted upon the top surface of the frame of the shackle, said mechanism, as shown in Fig. 2, comprising a two-part cylindrical housing 16, 17, sealed together by means of member 18. A solenoid 19 is mounted within one end of the housing 17 and comprises a cap 20, an inner sleeve 21 and a member 22. A ram or push-rod 23, comprising a heavy core 24 and a sleeve 25 joined to the head 26 of the core 24 by means of welding or the like, is mounted centrally of the solenoid 19, the cap 20 forming a suitable bearing for the ram 23. Member 22 of solenoid 19 is bored as at 27 to form a shoulder 28 and to permit the undercut end 29 of core 24 to pass therethrough. A heavy compression spring 30 is mounted on the ram 23 between the head 26 and the shoulder 28 to provide a loading means for the ram, the ring 31 fixed to the free end of sleeve 25 forming a limit for the outward movement of ram 23 by engagement with cap 20.

The member 22 of solenoid 19 is aligned by means of a pin 32 fixed in said member and projecting upwardly through a slot 33 formed in the sleeve 21 adjacent to the end thereof. Member 22 is machined to form a bearing 34 over which is fitted a spring loaded armature 35 comprising an inner ring 36 and an outer sleeve 37, which is, for example, sweat-fitted over ring 36. The outer sleeve 37 is connected to one end of a coil spring 38, the other end of the spring being fixed to the member 22 thereby providing a loading means for armature 35.

Figure 3:
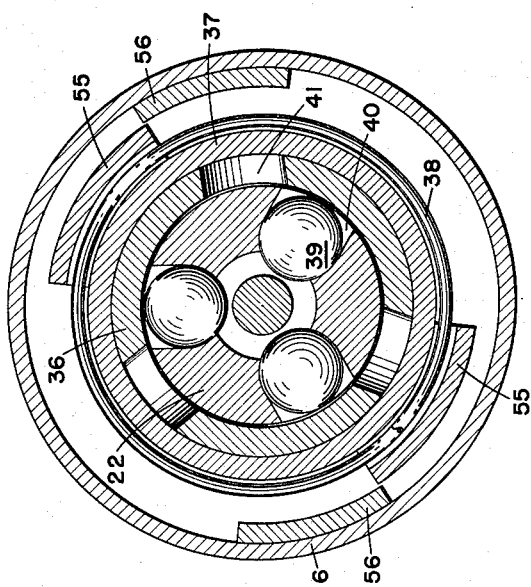
Fig. 3 is a section on the line 3—3 of Fig. 2 taken in the direction of the arrows.

Balls 39 mounted in recesses 40 are adapted to fit within the undercut portion of the ram 23 thereby holding said ram in cocked position, as shown in Figs. 2 and 3, by means of the armature ring 36. Ring 36 is also provided with recesses 41 (Fig. 3) whose function will be later described. Armature 35 is retained upon the member 22 by means of a snap ring 42 fitting within a groove 43 formed in the member 22, and is spaced from the edge of sleeve 21 by means of a thrust bearing 44 provided between the inner end of ring 36 and shoulder 45 of member 22.

Figure 4:
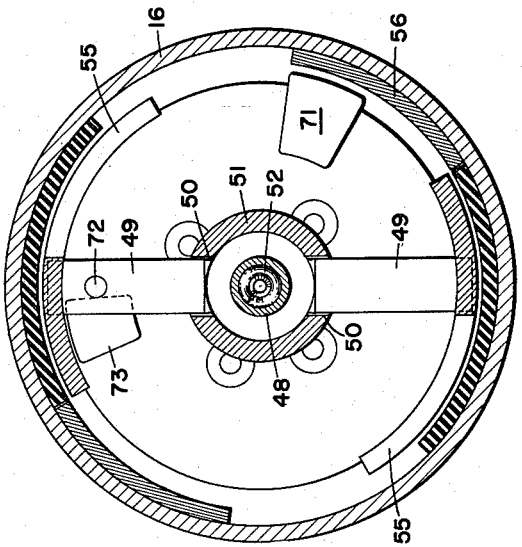
Fig. 4 is a section on the line 4—4 of Fig. 2 taken in the direction of the arrows.

The transfer switch member 47 in positioned adjacent the end of housing 16 and is held in such position in any suitable manner, there being an automatic resetting device 46 positioned between the end of ram 23 and the switch member 47. The resetting device is T-shaped and comprises a tubular member 48 having two outwardly extending rods 49 securely fixed thereto adjacent its outer end, as shown in Figs. 2 and 4. Rods 49 are arranged to reciprocate within slots 50 formed in a tubular member 51 carried by member 22 and are thus constrained against rotary motion. A compression spring 52 is mounted between head 53 of tubular member 48 and hollow boss 54 of switch member 47.

Pole pieces 55 are formed integral with the outer sleeve 37 of armature 35, as shown in Fig. 2, and are adapted to align themselves with stationary pole pieces 56 carried by the housing 16 when the solenoid 19 is energized. The pole pieces 55 of the armature 35 are provided with cam faces 57 for cooperating with the rods 49 in a manner to be described below.

Switch member 47 comprises a rotating switch 60 mounted over boss 54 and held thereon by means of a snap ring 61 seated in a groove 62 formed in said boss 54. A coil spring 63 is provided as a load for switch 60 and has one end attached to a stationary portion of member 47 its other end being connected to switch 60. Rotary switch 60 has a plurality of spring contacts, two being shown at 64 and 65, which are adapted to engage stationary contacts on member 47, two being shown at 66 and 67. Contacts 66 and 67 are connected to the external circuit by means of leads 68 and 69 contained in cable 70. Switch 60 carries a stop member 71 and a stop member 73 while rod 49 carries a pin member 72 for the purpose of resetting the mechanism in the manner to be set forth below.

The operation of this embodiment is as follows:

When an electrical energy impulse is received through cable 70 it completes a circuit through one of the leads, the switch, solenoid 19 and through a ground return. Energization of the solenoid sets up a magnetic field between the movable pole pieces 55 and the stationary pole pieces 56, causing said movable pieces and armature 35 to rotate in a clockwise direction as shown in Fig. 3. As the armature 35 rotates against the spring loading of spring 38 recesses 41 in the armature align with the recesses 40 and, due to the radial component of the force exerted by ram 23 and spring load 30, balls 39 are forced radially outwardly into the recess 41 thereby permitting the ram 23 to spring forward under the spring load until ring 31 engages cap 20.

When ram 23 is released resetting device 46 moves forward along slots 50 until rods 49 engage member 22, the rods 49 being free of the cam faces 57 of pole piece 55. Switch member 47 is maintained in its closed position by means of the engagement of stop member 71 with pole piece 55. Thus, so long as the impulse is maintained, the rotary switch 60 is maintained in its initial setting and, therefore, prevents the accidental release of the succeeding bomb.

At the end of the impulse the magnetic field is broken and the armature 35 returns to its initial position as shown in Fig. 3 carrying pole piece 55 along with it. Rotary switch 60 is then free to rotate to its transfer switching position, under load spring 63, in which a circuit is completed to the succeeding release mechanism. As the armature 35 rotates to its initial position under the spring 38 load, balls 39 are again forced radially inwardly but are prevented from leaving recess 40 completely due to the contour of said recess as shown in Fig. 2.

In resetting the device, an inwardly directed axial force is exerted manually, or otherwise, on the outer end or head 26 of ram 23. As ram 23 is forced inwardly, resetting device 46 including member 48 and rods 49 moves inwardly towards switch 60. Since resetting device 46 is constrained to move axially in slots 50, the engagement of rod 49 on the cam surfaces 57 of pole piece 55 causes said pole piece and armature 35 to rotate to its energized position thereby aligning recesses 40 and 41 and permitting balls 39 to again enter said recesses so that ram 23 is free to return to its initial cocked position. When rods 49 drop free of pole piece 55, as shown in Fig. 2, armature 35 returns to its cocked position under load spring 38 thereby forcing balls 39 into the undercut portions of ram 23, as shown in Fig. 2, and maintaining said rod in cocked position. Furthermore, as armature 35 is rotated to its energized position by rods 49, pole piece 55 engages stop member 71 thereby returning rotary switch 60 to its initial closed position. When rods 49 pass free of pole pieces 55, pin 72 on the rods moves into position to engage stop member 73 and thereby stops rotary switch 60 in its closed position as shown in Fig. 4.

Figure 9:
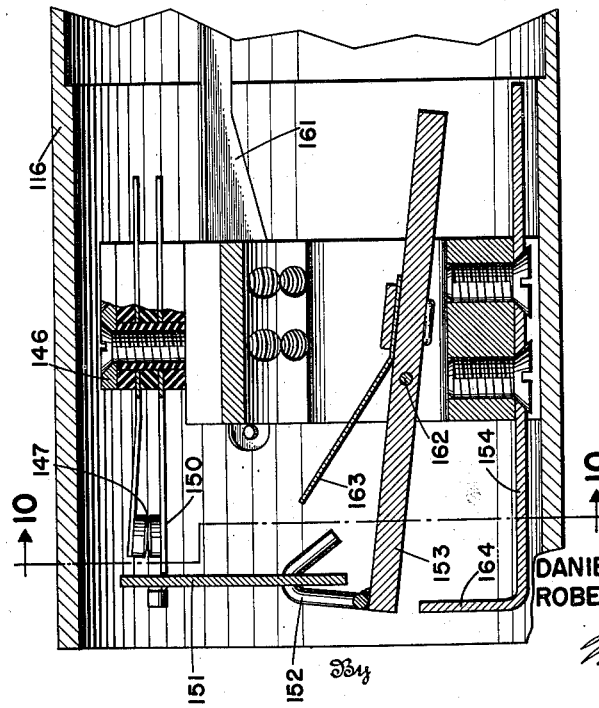
Fig. 9 is a longitudinal sectional view of the transfer switching mechanism to be used with the release mechanism of Fig. 6.

Referring now to Figs. 6 and 9, wherein a second embodiment of the release device and transfer switching device is shown, the mechanism comprises a two-part cylindrical housing 116, 117 which may be made unitary. A solenoid 119 is mounted within one end of the housing 117 and comprises a cap 120, an inner sleeve 121, and a member 122. The solenoid may be made unitary, if desired, but, as shown in Fig. 6, member 122 and sleeve 121 are held in aligned position by means of pin 132, and a lead into the coil of the solenoid is shown at 118. A ram or pushrod 123, comprising a heavy core 124 and a sleeve 125 joined to the head 126 of the core 124 by means of threading or the like, is mounted centrally of the solenoid 119, the cap 120 forming a suitable bearing for the ram.

Member 122 of solenoid 119 is bored as at 127 to form a shoulder 128 for positioning a heavy compression spring 130 mounted on the ram 123 between shoulder 129 formed on one end of sleeve 125 and said shoulder 128. Spring 130 provides a loading means for ram 123, the ring 131 fixed to the free end of sleeve 125 forming a limit for the outward movement of ram 123 by engagement with the buffer spring 133. Member 122 is machined to form a bearing 134 over which is fitted a spring loaded armature 135 comprising preferably an inner ring 136 and an outer sleeve 137 which may, if desired, be made unitary. Outer sleeve 137 is connected to one end of a coil spring 138, the other end of the spring being connected to member 122 so as to provide a loading means for armature 135.

Balls 139 mounted in recesses 140 in member 122 are adapted to fit within the undercut portion 115 of the ram 123 thereby holding said ram in cocked position, as shown in Figs. 6 and 8, by means of the armature ring 136. Ring 136 is provided with recesses 141, as shown in Fig. 8, for the function set forth in the explanation of the operation of the first embodiment. Armature 135 is held in place upon member 122 by means of a snap ring 142 fitting within a groove 143 formed in the member 122 and by means of bearings 144. The inner end 145 of ram 123 may be made separable, as shown, or unitary, whichever is more desirable.

Armature 135 comprises a plurality of movable pole pieces 155, as shown in Fig. 8, while a similar number of stationary pole pieces 156 are secured to the casing 117 by means of screws 157, or any suitable fastening means. Stop members 158 are secured to the casing, as shown in Fig. 8, to limit the movement of the movable pole pieces 155, and screws or the like 159 are threaded in the pole pieces 155 to permit the initial adjustment of the movable pole pieces relative to the stationary pieces. Preferably, this adjustment is made so that the pole pieces are edge to edge in the cocked position as indicated in Fig. 8. Clamping means 160 are provided in casing 117 for cooperation with prongs 161 in casing 116 for aligning the casing sections.

Figure 10:
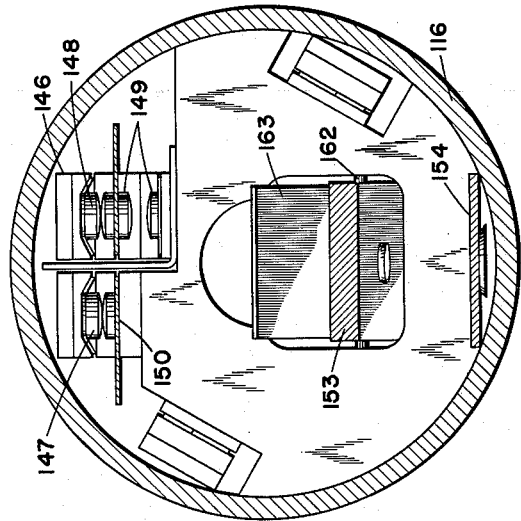
Fig. 10 is a section on the line 10—10 of Fig. 9.

Reference is now had to Figs. 9 and 10 which disclose the transfer switch mechanism used with the release mechanism of Fig. 6. A switch mechanism 146 comprises a plurality of spring contacts, three pairs being shown at 147, 148 and 149, said contacts being arranged to complete the necessary circuit from the external supply to the solenoid 119 of Fig. 6. One contact of each of said pairs is carried by a spring lever 150 supporting a link member 151 at one end thereof, the other end of link 151 being connected to a double hook 152 welded, or otherwise secured to a pivoted member 153 of magnetic material. Supported on casing 116 is another magnetizable member 154 which is adapted to contact the stationary pole piece 156 in casing 117 when the entire unit is assembled while member 153 engages the movable pole piece 155. Member 153 is pivoted at 162 and is retained in the position shown in Fig. 9 by means of leaf spring 150.

The operation of the embodiment of Figs. 6 to 10 is substantially the same as that of the first embodiment and when an impulse is received from the external circuit it energizes solenoid 119 causing the production of a magnetic field and the rotation of armature 135 to release the locking balls 139 and spring-loaded ram 123. In the released position, balls 139 are held in the recesses 140 and 141 by means of the inner end 145 of ram 123, as shown in Fig. 7, thus preventing the armature from returning to its initial cocked position after the impulse ceases. In resetting the device, ram 123 is forced inwardly, either manually or otherwise, until the undercut portions 115 of ram 123 are aligned with balls 139 at which time the balls 139 are forced back into recesses 140 and undercut portion 115 by means of load spring 138 thereby causing the armature 135 to rotate back into its initial cocked position, as shown in Fig. 6.

In the initial cocked position, as shown in Fig. 6 end 145 of ram 123 is positioned against member 163 holding member 153 against the end 164 of member 154 thereby closing contacts 149 while holding contacts 147 and 148 open. The electrical energy is supplied to the solenoid 119 through closed contacts 149, these contacts remaining closed until the end of the impulse. These contacts remain closed during the duration of the impulse by means of the parallel or bleeder flux path set up in elements 153 and 154. Thus, even through ram 123 is released and end 145 no longer holds member 153 against end 164 of member 154, the magnetic field set up in these members is sufficient to maintain them in closed position, although it need not be sufficient to effectuate a closing. Therefore, until the impulse is ended contacts 147 and 148 remain open and no circuit is completed to the succeeding release mechanism, thereby preventing inadvertent actuation of said succeeding mechanism. When the impulse ceases, the magnetic field is broken and member 153 returns to its open position under load spring 150 closing contacts 147 and 148 and opening contact 149, as shown in Figs. 9 and 10. In resetting, end 145 again depresses member 163 thus closing contacts 149 and holding the mechanism in its initial cocked position.

The mechanism of this invention is 65% smaller, 50% lighter and exerts a 35% greater force than any of the heretofore known bomb release mechanisms and has been found to contain excellent shock characteristics whereby almost all inadvertent actuations have been completely eliminated. This is due to a large extent, though not entirely, to the fact that the shock force must be extremely large and complex before an accidental actuation will occur.

It should be understood, of course, that the foregoing disclosure relates to only preferred embodiments of the invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. A bomb release mechanism actuated by an electrical impulse, said mechanism comprising: a loaded member; locking means for retaining said member in cocked position; means energizable by the impulse for generating a magnetic field; and biased rotatable means positioned coaxial with said member and rotatably actuated by the magnetic field against said bias for releasing said locking means from said loaded member, said loaded member being arranged to move into operative position upon release of said locking means.

2. A release mechanism according to claim 1 and a transfer switch operable in response to cessation of the impulse for completing a circuit to a succeeding release mechanism.

3. A release mechanism according to claim 1 and a first set of contacts for completing a first circuit for applying the impulse to said generating means, means for maintaining said contacts closed during the duration of the impulse; a second set of contacts for completing a circuit to a succeeding release mechanism; and means for maintaining said second contacts open until the cessation of said impulse after release of said member.

4. A bomb release mechanism actuated by an electrical impulse, said mechanism comprising: a loaded member; locking means for retaining said member in cocked position; means surrounding said member and energizable by the impulse for generating a magnetic field; and permeable means rotatable about said member by said magnetic field for releasing said locking means from said loaded member whereby said loaded member is moved into operative position upon application of the impulse.

5. A bomb release mechanism comprising: a solenoid for generating a magnetic field; a spring loaded ram axially positioned with respect to said solenoid; a permeable member rotatable by said magnetic field; and locking means operable by said member for maintaining said ram in cocked position, said permeable member being arranged to release said locking means upon rotation of said member in said magnetic field.

6. A bomb release mechanism actuated by an electrical impulse, said mechanism comprising: a spring loaded actuating ram; a solenoid coil energized by the impulse for generating a magnetic field, said coil being concentric with and encircling said ram; locking means encircling said ram for normally retaining said ram in cocked position; and a rotatable permeable member surrounding said locking means, said member being rotated by said magnetic field to release said locking means for permitting said ram to move into operative position.

7. An electrical impulse actuated bomb release mechanism comprising: a spring loaded actuating ram; locking means concentric with and encircling said ram for retaining said ram in cocked position; a spring loaded rotatable permeable member surrounding said locking means, said member being operable in its normal position to retain said locking means in its locking position, and in its rotated position to release said locking means; and a solenoid coil energized by the impulse for producing a magnetic field for rotating said member, said coil being concentric with and encircling said rod.

8. A bomb release mechanism actuated by an electrical impulse, said mechanism comprising: a cylindrical casing; a solenoid coil energizable by the impulse for producing a magnetic field, said coil being concentric with and within said casing; a spring loaded actuating ram concentric with said coil and said casing, said ram having an undercut portion; ball locking means normally positioned in said undercut portions for retaining said ram in cocked position; and a permeable member surrounding said locking means for normally maintaining said locking means in locking position, said member being rotatable by said magnetic field for releasing said locking means whereby said ram is permitted to move into actuating position.

9. A bomb release mechanism actuated by an electrical impulse, said mechanism comprising: a loaded actuating ram; means energized by the impulse for generating a magnetic field; locking means normally retaining said ram in cocked position; a rotatable permeable member surrounding said locking means, said member being rotated by said magnetic field for releasing said locking means; a set of contacts for applying said impulse to said generating means, said switch being normally closed by said ram; and a pair of permeable members connected to said generating means and said rotatable member for maintaining said contacts closed for the duration of the impulse.

10. A mechanism according to claim 9 including a second set of contacts for completing a circuit to a succeeding release mechanism; and means for maintaining said second contacts open when said first contacts are closed.

11. A bomb release mechanism actuated by an electrical impulse, said mechanism comprising: a loaded member; locking means for retaining said member in cocked position; means energizable by the impulse for generating a magnetic field; permeable means rotatable by said magnetic field for releasing said locking means from said loaded member to permit said loaded member to move into actuating position; a switch for completing the circuit to said generating means, said switch being retained closed by said loaded member in its cocked position; and means responsive to said magnetic field for completing an auxiliary flux path to hold said switch closed for the duration of said impulse.

12. A mechanism according to claim 11 including a transfer switch for completing an electrical circuit to a succeeding release mechanism; and means for actuating said transfer switch to closed position upon cessation of said impulses after release of said loaded member.

13. A bomb release mechanism actuated by an electrical impulse, said mechanism comprising: a loaded member; locking means for retaining said member in cocked position; means energizable by the impulse for generating a magnetic field; permeable means rotatable by said magnetic field for releasing said locking means from said loaded member to permit said loaded member to move into actuating position; and a rotary switch operable by said permeable means for completing a circuit to said generating means, said switch remaining closed for the duration of the impulse.

14. A mechanism according to claim 13 wherein said switch comprises a pair of contacts for completing a circuit to a succeeding release mechanism, said pair of contacts remaining open for the duration of the impulse.

15. A mechanism according to claim 13 and reciprocating means movable with said loaded member, said reciprocating means maintaining said rotary switch in closed position when said loaded member is in cocked position.

16. A mechanism according to claim 13 wherein said permeable means includes means for holding said rotary switch in closed position for the duration of the impulse after said loaded member has been released.

DANIEL E. SCHWARTZ.
ROBERT E. KEMELHOR.

REFERENCES CITED

The following references are of record in the file of this patent:

UNITED STATES PATENTS

| Number | Name | Date |
|---|---|---|
| 552,924 | Reynolds | Jan. 14, 1896 |
| 1,421,317 | Snell et al. | June 27, 1922 |
| 1,510,445 | Henry | Sept. 30, 1924 |
| 2,216,620 | List | Oct. 1, 1940 |
| 2,289,227 | Walker | July 7, 1942 |
| 2,319,279 | Watkins | May 18, 1943 |
| 2,329,182 | Boynton | Sept. 14, 1943 |